United States Patent
Murota

(10) Patent No.: US 9,656,362 B2
(45) Date of Patent: May 23, 2017

(54) TOOL CHANGER EQUIPPED WITH COVERS

(71) Applicant: FANUC Corporation, Yamanashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 110 days.

(21) Appl. No.: 14/484,331

(22) Filed: Sep. 12, 2014

(65) Prior Publication Data

US 2015/0087487 A1 Mar. 26, 2015

(30) Foreign Application Priority Data

Sep. 26, 2013 (JP) .................. 2013-199913

(51) Int. Cl.
*B23Q 3/157* (2006.01)
*B23Q 11/08* (2006.01)
*B23Q 3/155* (2006.01)

(52) U.S. Cl.
CPC .......... *B23Q 11/08* (2013.01); *B23Q 3/15534* (2016.11); *B23Q 3/15706* (2013.01); *Y10T 483/115* (2015.01); *Y10T 483/1748* (2015.01); *Y10T 483/1795* (2015.01)

(58) Field of Classification Search
CPC ........... Y10T 483/115; Y10T 483/1752; Y10T 483/1755; Y10T 483/1757; Y10T 483/176; Y10T 483/179; Y10T 483/1793; Y10T 483/1795; Y10T 483/1798; Y10T 483/1882; Y10S 483/90; B23Q 3/155–3/15793; B23Q 11/08–11/0891

USPC .................. 483/3, 54–57, 38–41, 67, 900
See application file for complete search history.

(56) References Cited

U.S. PATENT DOCUMENTS

| | | | | |
|---|---|---|---|---|
| 4,499,650 A * | 2/1985 | Cannon | ............... | B23Q 3/15526 211/1.53 |
| 5,499,963 A * | 3/1996 | Fujimoto | ........... | B23Q 3/15706 483/54 |
| 7,445,587 B2 * | 11/2008 | Kojima | ............... | B23Q 3/15706 483/39 |
| 2011/0083307 A1 * | 4/2011 | Shih | .................. | B23Q 3/15706 483/56 |

(Continued)

FOREIGN PATENT DOCUMENTS

JP 4-86137 U 7/1992
JP 2006-305663 A 11/2006
(Continued)

OTHER PUBLICATIONS

Machine translation of Japanese Patent Application No. 2013-215607, filed Oct. 16, 2013.*

(Continued)

Primary Examiner — Erica E Cadugan
(74) Attorney, Agent, or Firm — Hauptman Ham, LLP

(57) ABSTRACT

A tool changer is equipped with a turret having plural grips for use to grip tools as well as with a front cover and rear cover adapted to cover a front face and rear face of the turret. Furthermore, a protrusion is installed on the rear cover in a neighborhood of a gap between the front cover and the rear cover, being configured to block intrusion of chips or cutting fluid into the gap between the front cover and the rear cover from a top face of the rear cover.

6 Claims, 2 Drawing Sheets

(56) References Cited

U.S. PATENT DOCUMENTS

| | | | | |
|---|---|---|---|---|
| 2014/0256527 A1* | 9/2014 | Liu | .................... | B23Q 3/15706 483/54 |
| 2015/0105229 A1* | 4/2015 | Li | ......................... | B23Q 3/157 483/13 |
| 2015/0111710 A1* | 4/2015 | Murota | .................. | B23Q 3/157 483/13 |
| 2015/0190897 A1* | 7/2015 | Murota | .................. | B23Q 11/08 483/69 |

FOREIGN PATENT DOCUMENTS

| | | |
|---|---|---|
| JP | 2008-229770 A | 10/2008 |
| JP | 2010-99766 A | 5/2010 |
| JP | 2011-173197 A | 9/2011 |

OTHER PUBLICATIONS

Machine translation of Japanese Patent Application No. 2014-002014, filed Jan. 8, 2014.*
Machine Translation JP 2006-305663 A, which JP '663 was published Nov. 9, 2006.*
Decision to Grant a Patent mailed Mar. 24, 2015, corresponding to Japanese patent application No. 2013-199913.

* cited by examiner

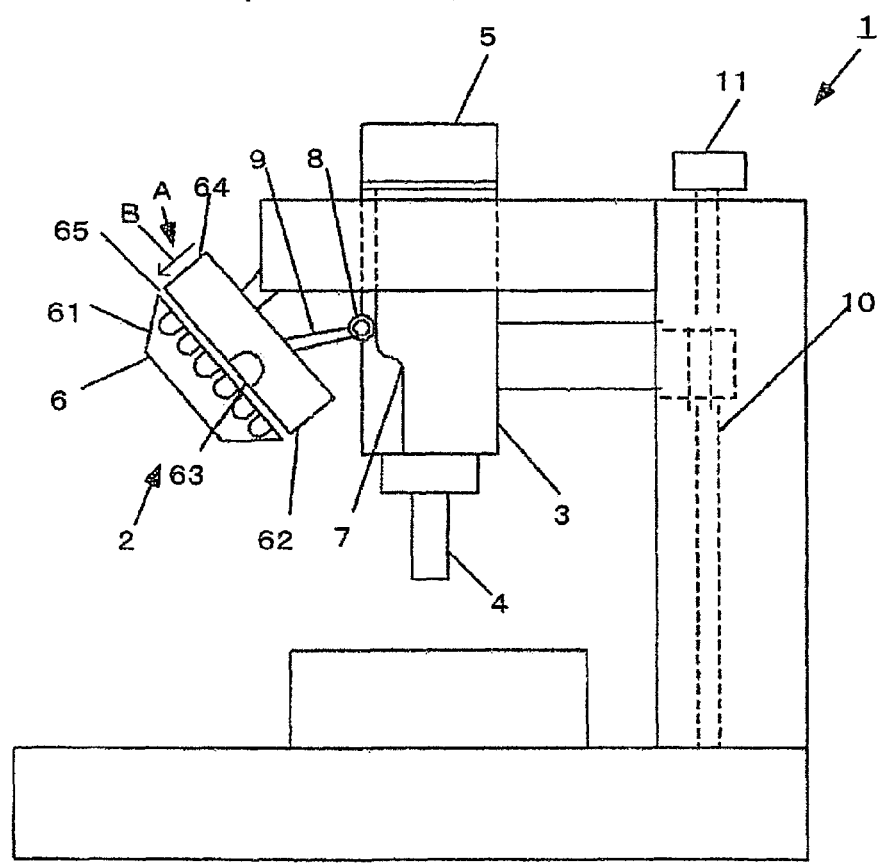

TOOL CHANGER EQUIPPED WITH COVERS

RELATED APPLICATIONS

The present application claims priority to Japanese Application Number 2013-199913, filed Sep. 26, 2013, the disclosure of which is hereby incorporated by reference herein in its entirety.

BACKGROUND OF THE INVENTION

Field of the Invention

The present invention relates to a tool changer equipped with covers to prevent intrusion of foreign matter into a turret.

Description of the Related Art

A tool changer which automatically changes a tool mounted on a spindle of a machine tool are used conventionally. Plural tools necessary for operations are set in advance on the tool changer, which is configured to automatically change the tool mounted on the spindle of the machine tool to a specified tool according to machining conditions.

Examples of a machine tool equipped with such an automatic tool changer adapted to automatically change the tool includes a machine tool equipped with a turret which in turn is equipped with plural grips adapted to grip tools. Such a machine tool is disclosed in Japanese Patent Application Laid-Open No. 2010-99766. The machine tool has a turret in which plural tools are mounted and changes the tool mounted on the spindle by indexing the turret, making it possible to change the tool precisely at high speed. However, the turret and the turret base are simply connected with each other with a space provided between the front side of the turret and the base, and consequently, there is fear that chips produced during machining or a cutting fluid might intrude inside the turret.

FIG. 3 shows an automatic tool changer 2 adapted to automatically change a tool 4 mounted on a spindle 3 of a machine tool 1, according to conventional art.

In the automatic tool changer 2, as shown in FIG. 3, the turret 6 is equipped with covers to prevent intrusion of chips and cutting fluid into the turret 6 when a workpiece is machined. The machine tool 1 includes a spindle 3 and a spindle motor 5 adapted to drive the spindle 3 and a tool 4 is mounted on a tip of the spindle 3. Also, the spindle 3 is connected with a Z-axis motor 11 via a Z-axis ball screw 10, and the spindle 3 can be driven upward and downward by the Z-axis motor 11. Furthermore, the turret 6 is provided as a member for use to change the tool 4.

The turret 6 is equipped with a front cover 61 and rear cover 62 to avoid impacts on structural members (not shown) inside the turret 6, where the front cover 61 plays a role in preventing intrusion of chips and cutting fluid through the front face of the turret 6 while the rear cover 62 plays a role in preventing intrusion of chips and cutting fluid through the rear face of the turret 6.

Thus, depending on the geometry of the rear cover 62, chips and cutting fluid may tend to gather on a top side (part A) of a cylindrical portion 64. Then, in changing the tool 4, the spindle 3 is driven upward and downward by the Z-axis motor 11. Here, as the spindle 3 is provided with a cam 7, when the spindle 3 is moved up and down, the turret 6 is caused to perform oscillating motion by a cam follower 8 configured to follow the cam 7. Consequently, there is fear that during the oscillating motion, the chips and cutting fluid gathered on the top side (part A) of the cylindrical portion 64 might intrude inside the turret 6 through a gap 65 between the front cover 61 and rear cover 62 as indicated by a path B and adversely affect the structural members inside the turret 6.

SUMMARY OF THE INVENTION

Thus, an object of the present invention is to provide a tool changer equipped with covers adapted to prevent intrusion of chips and cutting fluid into a turret.

A tool changer according to the present invention is equipped with a turret having plural grips for use to grip tools and adapted to change a tool by indexing a desired tool by rotating the turret. The tool changer further comprises: a front cover adapted to cover a front face of the turret; a rear cover adapted to cover a rear face of the turret; and a protrusion provided on the rear cover in a neighborhood of a gap between the front cover and the rear cover. The protrusion is configured to block a path for chips or cutting fluid to intrude into the gap between the front cover and the rear cover from a top face of the front cover or a top face of the rear cover.

The present invention provides a tool changer equipped with covers capable of preventing chips produced during machining of a workpiece and cutting fluid used for machining from intruding inside the turret through the gap between the front cover and the rear cover.

BRIEF DESCRIPTION OF THE DRAWINGS

The above and other objects and features of the present invention will become apparent from the following description of the embodiments taken in conjunction with the accompanying drawings, wherein:

FIG. 3 is a schematic side view of a tool changer equipped with covers according to conventional art.

DETAILED DESCRIPTION OF THE PREFERRED EMBODIMENTS

Figure 1:
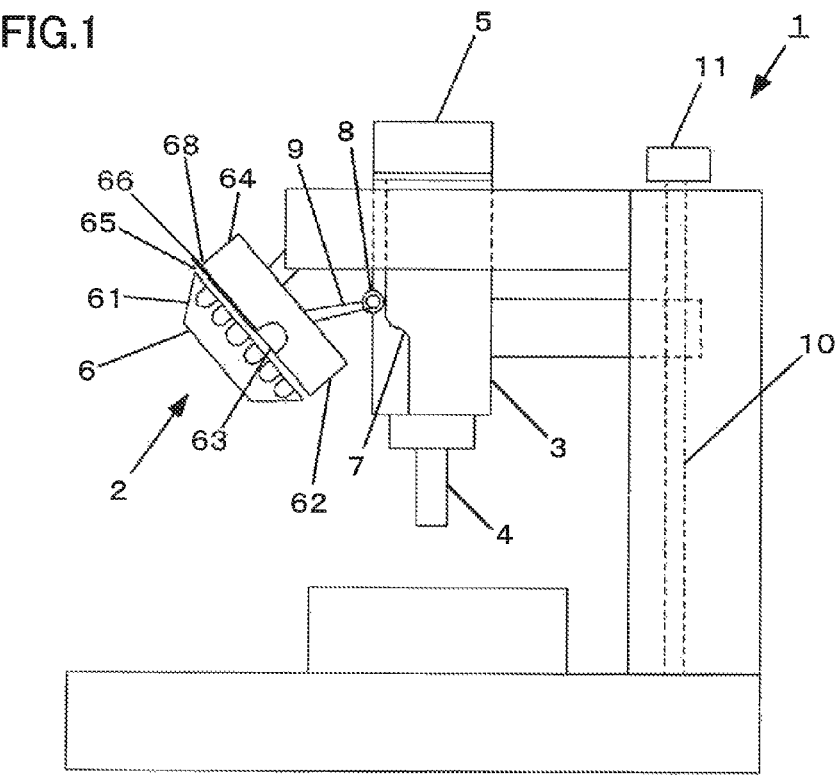
FIG. 1 is a schematic side view of a first embodiment of a tool changer equipped with covers according to the present invention.

First, a first embodiment of a tool changer equipped with covers according to the present invention will be described with reference to FIG. 1.

The present embodiment differs from a conventional art shown in FIG. 3 in that a protrusion 66 is provided on the rear cover 62 at an upper half portion thereof so as to face the front cover 61. As the protrusion 66 is provided on the rear cover 62, a V groove 68 is formed between a cylindrical portion 64 of the rear cover 62 and the protrusion 66. With this V groove 68, chips produced during machining of a workpiece and cutting fluid used for machining can be prevented from intruding inside the turret 6 through the gap 65 formed between the front cover 61 and rear cover 62.

Also, to change the tool 4, the spindle 3 is driven by the Z-axis motor 11 so as to move up and down. In so doing, since the spindle 3 is provided with a cam 7, when the spindle 3 is moved up and down, the turret 6 is oscillated by a cam follower 8 configured to follow the cam 7. The oscillating motion shakes any chips built up on a top side of the cylindrical portion 64 of the rear cover 62 out of the turret 6 along the V groove 68. Also, any cutting fluid gathered on the top side of the cylindrical portion 64 of the rear cover 62 is shaken out of the turret 6 along the V groove 68 without intruding inside the turret 6. This prevents chips and cutting fluid from intruding inside the turret 6 and thereby prevents impacts on structural members (not shown) inside the turret 6.

Although, in the present embodiment, the protrusion 66 is provided on the rear cover 62 at an upper half thereof so as to face the front cover 61, the protrusion 66 may be provided on the rear cover 62 around the entire circumference thereof. Further, the protrusion 66 may be provided on the front cover 61, instead of the rear cover 62, on that side of the front cover 61 which faces the rear cover 62, or the protrusion 66 may be provided separately from the front cover 61 and rear cover 62.

Figure 2:
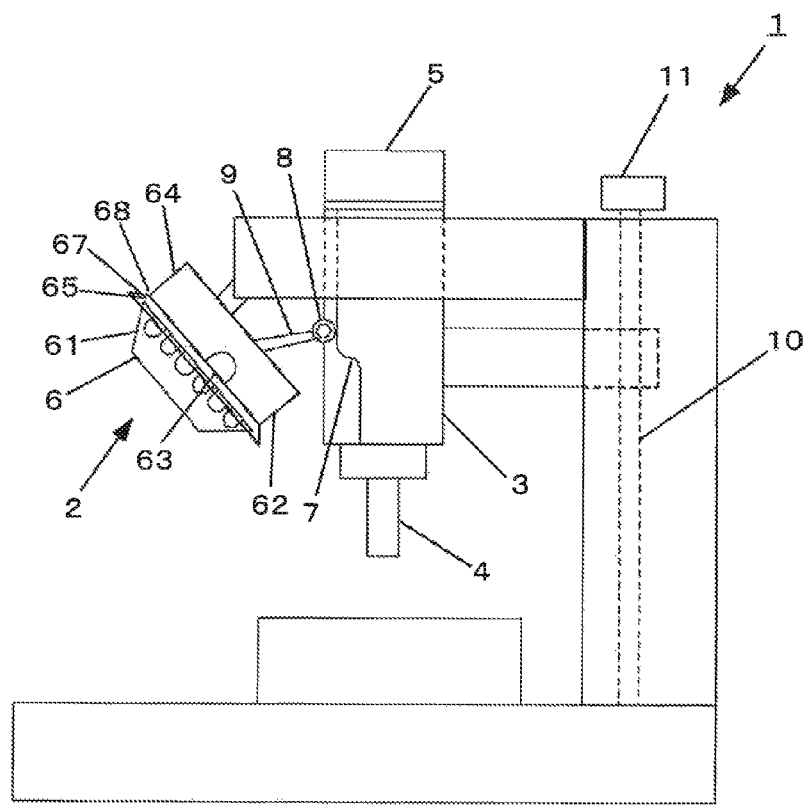
FIG. 2 is a schematic side view of a second embodiment of a tool changer equipped with covers according to the present invention.

Next, a second embodiment of a tool changer equipped with covers according to the present invention will be described with reference to FIG. 2.

Whereas in the first embodiment described above, the protrusion 66 projects almost perpendicularly to the cylindrical portion 64 of the rear cover 62 as shown in FIG. 1, the second embodiment differs from the first embodiment in that the protrusion 66 projects at an angle of 90 degrees or more with respect to the cylindrical portion 64 of the rear cover 62 (that is, forming an oblique protrusion 67).

According to the present embodiment, the oblique protrusion 67 is provided on the rear cover 62 around the entire circumference thereof on the side which faces the front cover 61. As the oblique protrusion 66 is provided on the rear cover 62, a V groove 68 is formed between a cylindrical portion 64 of the rear cover 62 and the oblique protrusion 67. With this V groove 68, chips produced during machining of a workpiece and cutting fluid used for machining can be prevented from intruding inside the turret 6 through the gap 65 formed between the front cover 61 and rear cover 62.

Also, to change the tool 4, the spindle 3 is driven by the Z-axis motor 11 so as to move up and down. In so doing, since the spindle 3 is provided with a cam 7, when the spindle 3 is moved up and down, the turret 6 is oscillated by a cam follower 8 configured to follow the cam 7. The oscillating motion shakes any chips built up on a top side of the cylindrical portion 64 of the rear cover 62 out of the turret 6 along the V groove 68. Also, any cutting fluid gathered on the top side of the cylindrical portion 64 of the rear cover 62 is shaken out of the turret 6 along the V groove 68 without intruding inside the turret 6. This prevents chips and cutting fluid from intruding inside the turret 6 and thereby prevents impacts on structural members (not shown) inside the turret 6.

Although in the present embodiment, the oblique protrusion 67 is provided on the rear cover 62 around the entire circumference thereof, the oblique protrusion 67 may be provided on the rear cover 62 at only an upper half portion thereof. Further, the oblique protrusion 67 may be provided on the front cover 61, instead of the rear cover 62, on that side of the front cover 61 which faces the rear cover 62, or the protrusion, or the oblique protrusion 67 may be provided separately from the front cover 61 and rear cover 62.

What is claimed is:

1. A tool changer, comprising:
   a turret configured to grip tools, the tool changer being adapted to change a tool mounted on a spindle of a machine tool by indexing a desired tool by rotating the turret;
   a front cover adapted to cover a first surface of the turret;
   a rear cover adapted to cover a second surface of the turret, the rear cover including a cylindrical portion having a cylindrical surface portion having a cylinder center axis; and
   a gap defined between the front cover and the rear cover, wherein the front and rear covers are distant from each other by the gap,
   wherein
      the first surface of the turret is positioned farther from the spindle of the machine tool than from the gap,
      the second surface of the turret is positioned closer to the spindle of the machine tool than the gap is,
   an upper end of the cylindrical portion of the rear cover is higher than an upper end of the front cover in a state where tool change is not performed, and
   a protrusion, protruding from the cylindrical surface portion away from the cylinder center axis, is provided on the rear cover at a position between an upper surface of the upper end of the cylindrical portion of the rear cover and the gap in the state where tool change is not performed, and the protrusion is configured to block chips and cutting fluid from intruding into the gap.

2. The tool changer according to claim 1, wherein a V groove is formed between the cylindrical portion and the protrusion.

3. The tool changer according to claim 1, wherein the protrusion projects perpendicularly to an axis of the cylindrical portion.

4. The tool changer according to claim 1, wherein the protrusion projects at an angle of 90 degrees or more with respect to an axis of the cylindrical portion of the rear cover.

5. The tool changer according to claim 1, wherein the protrusion projects from the upper end of the cylindrical portion of the rear cover away from a rotational axis of the turret.

6. A tool changer, comprising:
   a turret configured to grip tools, the tool changer being adapted to change a tool mounted on a spindle of a machine tool by indexing a desired tool by rotating the turret;
   a front cover adapted to cover a first surface of the turret;
   a rear cover adapted to cover a second surface of the turret; and
   a gap defined between the front cover and the rear cover, wherein the front and rear covers are distant from each other by the gap,
   wherein
      the first surface of the turret is positioned farther from the spindle of the machine tool than from the gap,
      the second surface of the turret is positioned closer to the spindle of the machine tool than the gap is,
   an upper end of the rear cover is higher than an upper end of the front cover in a state where tool change is not performed,
   a protrusion is provided on the rear cover at a position between an upper surface of the upper end of the rear cover and the gap in the state where tool change is not performed, and the protrusion is configured to block chips and cutting fluid from intruding into the gap,
   the protrusion extends around an entire circumference of the rear cover, and
   the rear cover has opposite first and second sides, the first side is closer to the gap than the second side is, and the protrusion is arranged on said first side of the rear cover.

* * * * *